March 17, 1936.  R. T. BROCKMAN  2,034,387
POWER OPERATED TYPEWRITER
Filed Oct. 24, 1932  7 Sheets-Sheet 1

Fig.1.

INVENTOR
Robert T. Brockman
BY
Rector, Hickey, Davis & Macauley
ATTORNEYS

Fig. 2.

March 17, 1936. R. T. BROCKMAN 2,034,387
POWER OPERATED TYPEWRITER
Filed Oct. 24, 1932 7 Sheets-Sheet 6

Fig. 6.

INVENTOR
Robert T. Brockman
BY
ATTORNEYS

March 17, 1936.  R. T. BROCKMAN  2,034,387
POWER OPERATED TYPEWRITER
Filed Oct. 24, 1932   7 Sheets-Sheet 7

INVENTOR
Robert T. Brockman
BY
ATTORNEYS

Patented Mar. 17, 1936

2,034,387

UNITED STATES PATENT OFFICE 2,034,387

POWER OPERATED TYPEWRITER

Robert T. Brockman, Detroit, Mich., assignor to Burroughs Adding Machine Company, Detroit, Mich., a corporation of Michigan Application October 24, 1932, Serial No. 639,249

7 Claims. (Cl. 197—17)

This invention relates to a power operated typewriter. It concerns a construction in which various parts of a typewriter are operated by power, particularly the type bar action, the case shift, the back spacer and the escapement mechanism. It also concerns an improved means for preventing rebound of the type bars of a typewriter.

The general object of the invention is to provide an improved power operated typewriter.

A more particular object is to provide an improved power operated type action.

Another particular object is to provide an improved means for preventing rebound of the type bars of a typewriter.

A further object is to provide an improved case shift mechanism.

Still another object is to provide an improved back spacing mechanism.

Other objects and advantages of the invention will appear from the following specification and drawings.

An embodiment of the invention is shown in the accompanying drawings in which.

F g. 8 is a view similar to Fig. 2 but showing the parts in position with a key depressed and with the type bar actuator about to operate.

The typewriter is driven by an electric motor 10 (Fig. 1) which rotates a worm 11 meshing with a worm wheel 12 fixed to a main drive shaft 13, which is suitably journaled in the typewriter frame. While the machine is in use the motor rotates the drive shaft 13 continuously and power is taken from this shaft to operate various parts of the typewriter. Each of the parts or groups of parts will be described separately.

*Power operated type bar action*

The type bars are driven to printing position by being momentarily connected to the power shaft and then automatically disconnected prior to the time that they reach printing position, the momentum of the type bars being depended upon to cause the bars to move to final printing position. A plurality of type bars are provided but since the mounting and driving mechanism for each is alike, the description and illustration will be confined to the type bar for the sake of conciseness and simplicity.

Figure 1:
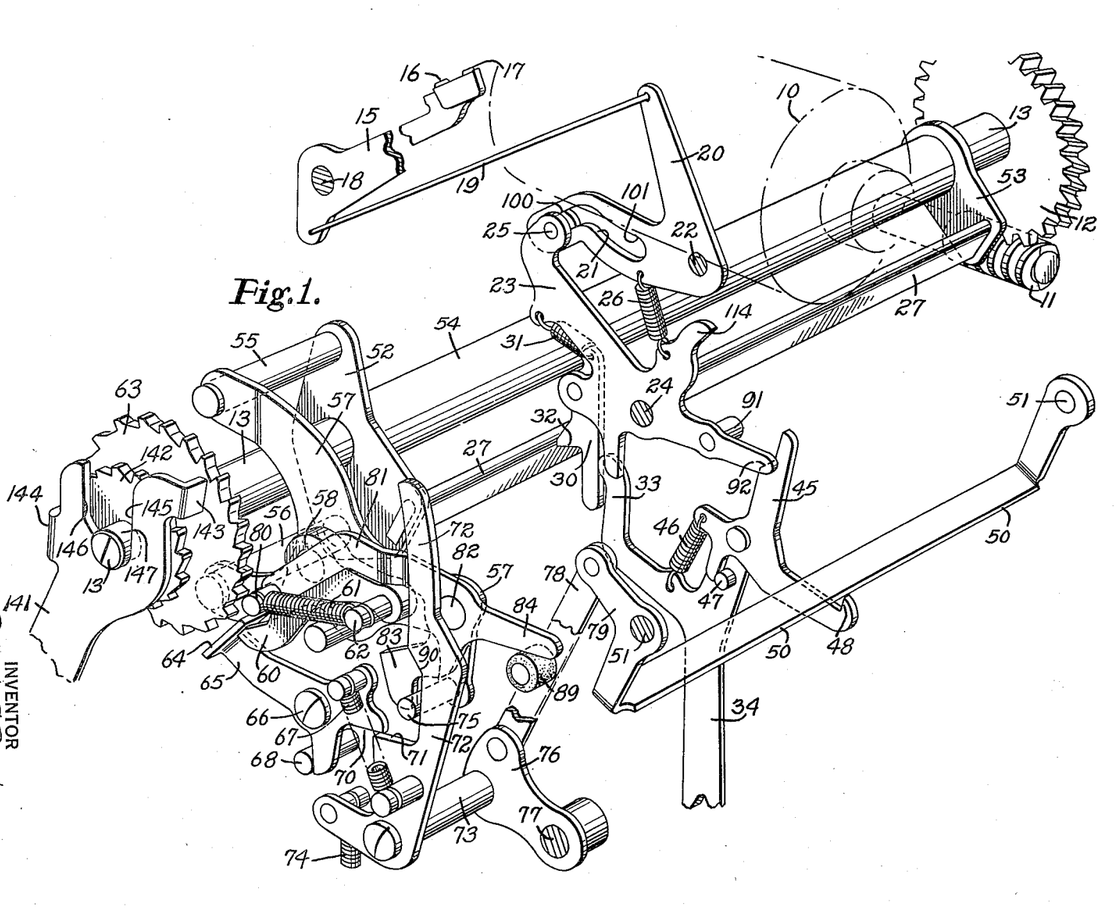
Figure 1 is a perspective view of a portion of the machine showing particularly the operating mechanism for the type bars.

Referring to Fig. 1, the machine is provided with a plurality of type bars, such as the bar 15, having lower case type 16 and upper case type 17. The type bar 15 is pivoted on a shaft 18 carried by a shiftable type basket that will be later described. Connected to the lower end of each type bar is a link 19 which is also connected to one arm of a bell crank lever 20 having a second arm provided with a cam slot 21. The bell crank lever is pivoted on a shaft 22 and rocked by means of an actuator 23 pivoted on a shaft 24 and carrying a cam roller 25 operating in the cam slot 21 in the arm of the bell crank lever 20. When the bell crank lever 20 is rocked clockwise from the position of Fig. 1, the link 19 is pulled forward and the type bar 15 is moved toward printing position. A spring 26 is connected between the actuator 23 and bell crank 20 to urge these parts to the position of Fig. 1.

The type bars are moved to printing position by an operating bail 27 which is adapted to engage the actuators 23 for each of the type bars. When a type key is depressed, the actuator for the type bar corresponding to the depressed key is moved into the path of the operating bail and the bail is connected to the power shaft. This causes the bail to be rocked and the type bar to be driven to printing position. After the type bar has moved a predetermined distance, the operating bail is automatically disconnected from the power shaft and the type bar is also automatically disconnected from the bail. The mechanism for accomplishing these results is as follows:

Pivoted to the actuator 23 is a pawl 30 urged counterclockwise as viewed in Fig. 1 by a spring 31. This pawl has a shoulder 32 adapted to engage over the operating bail 27 when the pawl is moved clockwise from its Fig. 1 position.

Figure 3:
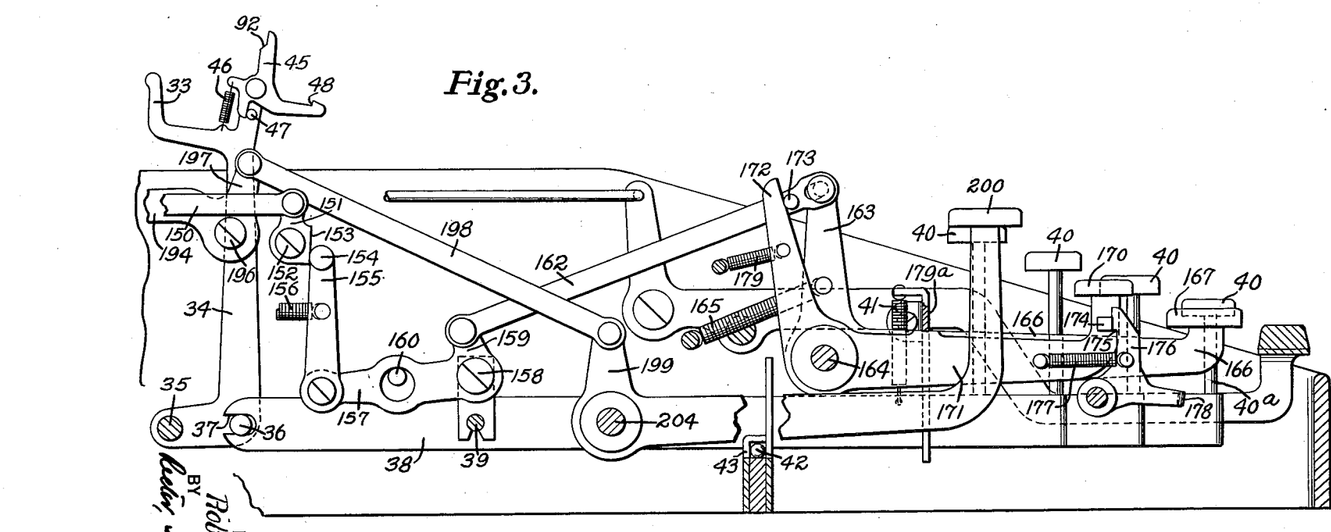
Fig. 3 is a partial left side elevation showing particularly the keyboard and certain of the control keys.

The pawl 30 is moved clockwise to bail-engaging position by an abutment arm 33 which is an integral part of a rock lever 34 that is rocked counterclockwise from its Fig. 1 position when a type key is depressed. Referring to Fig. 3, it will be observed that the rock lever 34 is an elbow lever pivoted on a shaft 35. The lever carries a stud 36 engaging in a slot 37 in the end of a key lever 38 which is pivoted on a shaft 39. The key lever 38 projects forward to where the stem 39 of a type key 40 is connected to it. The key lever 38 is urged counterclockwise to normal position by a spring 41 and depression of more than one key at a time is prevented by a series of balls 42 mounted in a raceway 43, there being just space enough between the balls to permit one key lever at a time to enter between them.

From Fig. 3 it will be clear that, when the type key 40 is depressed, the lever 38 is rocked clockwise, which rocks the lever 34 counterclockwise and moves the abutment arm 33 rearward to move the pawl 30 to bail-engaging position.

The operating bail 27 is momentarily connected to the power shaft 13 by depression of a type key and, for this purpose, the rock lever 34 is provided with a pawl 45 (Fig. 1) pivoted to it and urged counterclockwise by a spring 46 against a limit stud 47. This pawl has a nose 48 normally positioned in front of the edge of a bail 50 pivoted on studs 51 on stationary parts of the machine. When the rock lever 34 is moved counterclockwise from its Fig. 1 position, the nose 48 of pawl 45 engages the bail 50 and rocks it clockwise to momentarily connect the operating bail 27 to the power shaft 13.

The operating bail 27 is carried by two arms 52 and 53 which are fixed to a sleeve 54 rotatably mounted on the power shaft 13. The arm 52 carries two studs 55 and 56 which support a plate 57 on which is pivoted at 58 a pawl 60 urged clockwise, as viewed in Fig. 1, by a spring 61 connected to a stud 62 on the pawl. This pawl is adapted to engage a ratchet wheel 63 fixed to the power shaft 13. The pawl is urged by spring 61 toward ratchet-engaging position but is normally prevented from engaging the ratchet wheel by a plate 64 on the end of a detent 65 pivoted at 66 and urged clockwise by a spring 67 against a limit stud 68. The detent 65 has a forward projection 70 positioned over a shoulder 71 on a releasing member 72 pivoted on a stud 73 and urged counterclockwise by a spring 74, as well as by spring 67, against a limit stud 75 carried by the supporting plate 57. The stud 73 on which the release member 72 is pivoted is carried by an arm 76 pivoted on a shaft 77. A link 78 connects the arm 76 with an arm 79 integral with one side of the bail 50.

When a type key is depressed, the rock arm 34 moves counterclockwise, as viewed in Fig. 1, and the bail 50 is rocked clockwise. This pulls the link 78 upwardly which moves stud 73 with release member 72 upwardly. The shoulder 71 on the release member engages the projection 70 of detent 65 and rocks the detent counterclockwise so as to free the pawl 60 which is immediately urged by spring 61 into engagement with the rotating ratchet wheel 63. The ratchet wheel picks up the pawl and moves it, together with the plate 57, the studs 55—56 and the operating bail 27, counterclockwise about the axis of the drive shaft 13. When the arm 34 was rocked counterclockwise by depression of the type key, the pawl 30 on the actuator 23 was positioned over the operating bail 27. Accordingly, when the operating bail is moved upward, as above described, the actuator 23 is rocked clockwise as viewed in Fig. 1 and the type bar 15 is moved toward printing position.

An advantage of the above construction to be noted at this point is that the engagement between the operating bail 27 and the driving ratchet 63 is not dependent upon the character of depression of the type key. Nor does the type key have to tension any operating springs. The type key merely tensions the digit key lever spring 41 and moves the detent 65 to release pawl 60 which is moved to engaging position by the spring 61. This means that the engagement between the pawl 60 and the ratchet 63 is of the same character no matter whether the key is depressed slowly or very rapidly.

After the type bar has been moved a predetermined distance, the operating bail is automatically disconnected from the power shaft. For this purpose the following construction has been provided:

The spring 61 (Fig. 1) which urges the pawl 60 clockwise is connected to a stud 80 on a pawl-controlling member 81 pivoted at 82 on the plate 57. The spring 61 normally urges member 81 counterclockwise against the limit stud 75, the member being provided with a tail piece 83 for engagement with stud 75. It will be observed that the line of action of the spring 61 is below the pivot 58 of the pawl 60 so that the pawl is urged clockwise, or in a direction to engage the ratchet wheel 63.

Figure 5:
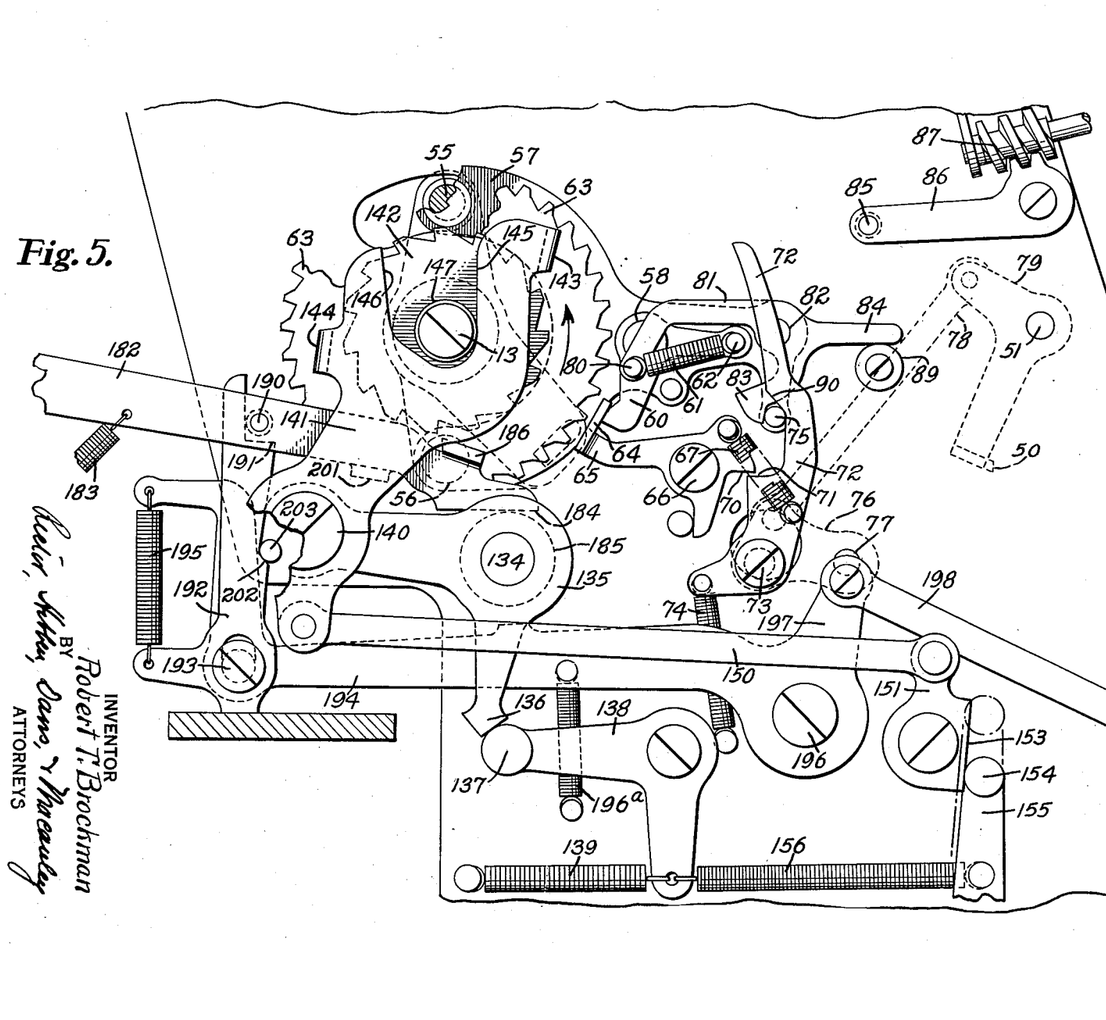
Fig. 5 is a partial left side elevation illustrating both the operating mechanism for the type bars and case shift mechanism.

The pawl-controlling member 81 has a second tail piece 84 which is positioned so that, when the supporting plate 57, on which the pawl 60 and the member 81 are mounted, is moved counterclockwise from the position of Figs. 1 and 5, the tail 84 will engage a stud 85 (Fig. 5) on an arm 86 which may be adjustably positioned by means of a worm 87 that can be rotated manually from the forward part of the machine. When the tail 84 of the member 81 strikes stud 85, the member 81 is rocked clockwise about its pivot 82 and the tail 83 of member 81 strikes stud 62 on pawl 60. This quickly and suddenly knocks the pawl 60 out of engagement with ratchet wheel 63. At the time that member 81 rocks clockwise, the stud 80 on said member moves upward and the line of action of the spring 61 moves above the pivot 58 of the pawl 60 with the result that the spring tends to hold the pawl in retracted position as well as to aid in retracting it.

It is to be observed that the pawl 60 is carried by a plate 57 which moves about the same axis as the ratchet wheel 63 so that no relative movement between the pawl and the ratchet wheel occurs during the driving action. This avoids wear between the parts such as would occur if these parts moved relatively while in driving engagement. No movement occurs between the pawl and ratchet wheel until the pawl is suddenly hit by the member 81 to suddenly and quickly move it to released position.

The automatic disconnection preferably occurs slightly before the type bar reaches printing position and the momentum of the bar is depended upon to carry it to its final printing position, the point of disconnection being regulated by varying the position of stud 85 (Fig. 5).

Figure 2:
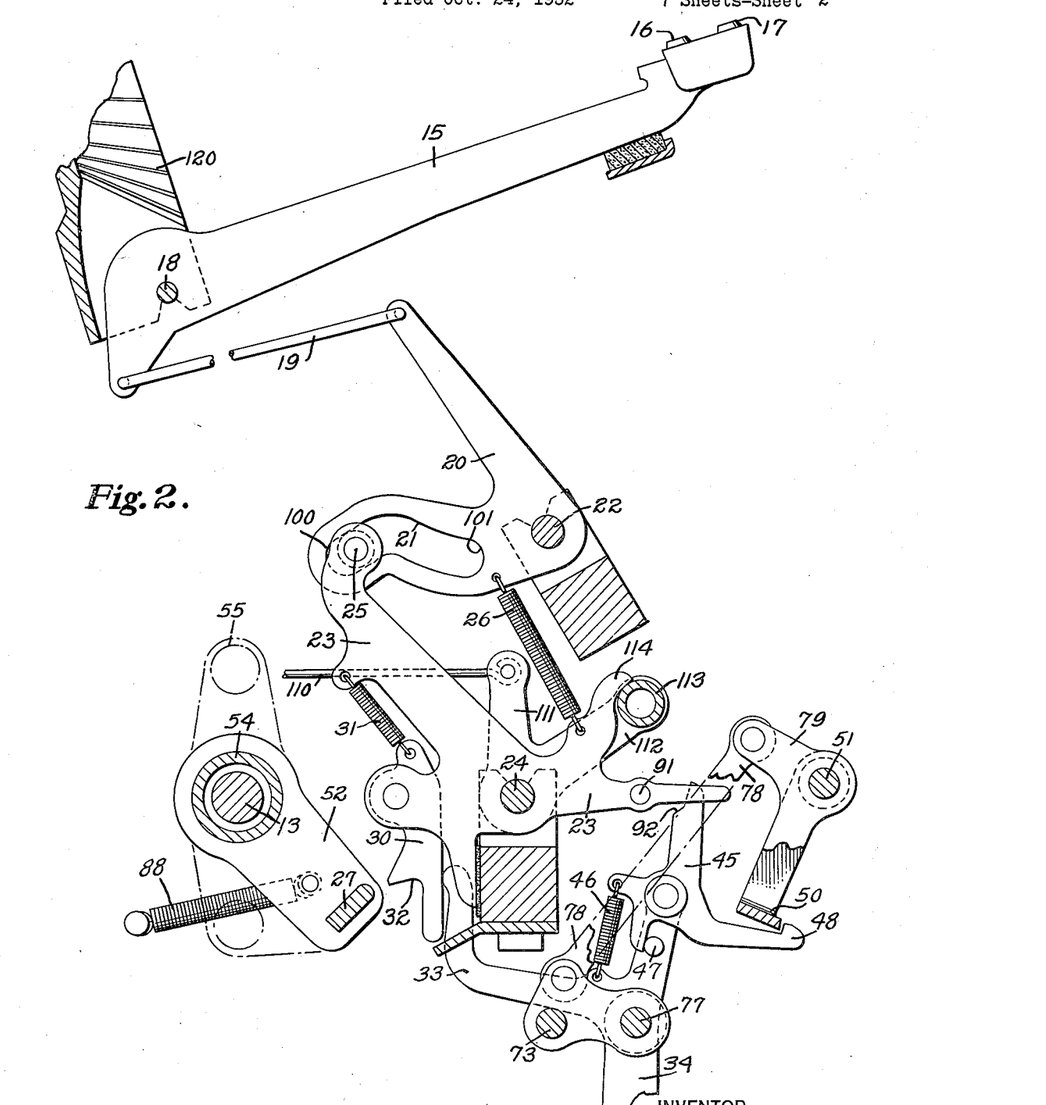
Fig. 2 is a partial left side elevation of the type bar operating mechanism, the parts being shown in normal position.

When the pawl 60 is released from the ratchet wheel 63 the operating bail 26 with its associated parts returns to normal under the influence of its spring 88 (Fig. 2). As these parts, including the member 81, return clockwise, the tail 84 of member 81 strikes a stationary stud 89 (Figs. 1 and 5) carried by one of the plates of the machine which rocks the member 81 counterclockwise to its normal position. The line of action of the spring 61 moves below the center of the pivot 58 of pawl 60 and the spring tends to rock the pawl into engagement with the ratchet wheel 63. Such engagement is prevented, however, by the detent 65 which moved to normal position while the type bar was being moved to printing position. When the plate 57 was moved counterclockwise during the type bar operating action, the stud 75 on said plate engaged a cam surface 90 on the detent-releasing member 72 and rocked said member clockwise so as to move its shoulder 71 from beneath the projection 70 on detent 65. Thereupon the spring 67 moved the detent 65 to normal position so that, when the bail and its associated parts are returned as above described, the detent was in position to arrest the pawl 60 in the Fig. 1 position.

It is to be observed that the above described movement of member 72 also prevents more than one operation of the type bar even though the type key may be held depressed. For example, when the type bar is moved toward printing position, the member 72 is moved clockwise and released from detent 65. If the type key is held depressed, the member 72 is held elevated and it is out of engaging position with projection 70 on detent 65 so that the control of the detent is lost. The detent returns to normal and prevents a second engagement of pawl 60 with ratchet wheel 63. If the type key is held depressed, it cannot result in a second operation of the type bar because the pawl 65 cannot be released until the key is released and depressed again.

A second means is provided that prevents more than one operation of a type bar when a type key is held depressed. Referring to Fig. 1, the actuator 23 is provided with a stud 91 which when the actuator is moved by bail 27, engages a cam surface 92 on the pawl 45 to rock the pawl clockwise out of engagement with the bail 50. The bail 50 can then return to normal under the influence of spring 74. If the type key is held depressed the lever 34 is held in its rear position where the nose 48 of the pawl 45 will be under the bail 50. As long as the lever 34 is held in this position, which it would be if the key were held depressed, the pawl 45 cannot reengage the bail and a second type bar driving action of the actuator cannot occur, because the bail 50, the link 78 and the member 72 for releasing the detent 65 cannot be moved a second time until the type key is released and then depressed again.

The provision of two releasing means as above described is not necessary and one may be omitted if desired. The preferred one at the present time is the release of pawl 45.

Rebound prevention

Preventing the type bars from rebounding in a power operated machine is one of the things that contributes to the success of this type of machine.

In key operated machines the keys are driven to printing position by the force of the key depression and they are returned by springs. The rapidity of action of a key operated machine usually depends upon the rapidity with which the type bars are returned to normal by the springs. If quick action is desired the springs must be made strong. On the other hand, if the springs are made strong, the key action becomes hard. Also when the springs are made strong, the type bars often rebound when they are brought back to normal, with the result that they interfere with one another and jamming occurs.

In power operated machines hard key action is not an objection because the type bars are moved to position by power. The returning springs may, accordingly, be made relatively strong, but, when they are made strong, the rebound becomes greater and difficulty is encountered by jamming. Control of this rebound action is one of the important factors in the speed of a power operated machine.

Rebound is prevented in the present machine by a novel construction of type bar action which effectively prevents rebound without requiring that special type bar rests or other rebound preventers be used.

Referring to Fig. 2, it will be observed that the slot 21 in the bell crank lever 20 is shaped so that the rear end 100 of the slot, that is, the part through which the cam roller 25 moves during the initial movement of the actuator 23, is approximately concentric with the axis of the shaft 24 about which the actuator 23 rocks. As the actuator 23 is rocked counterclockwise from the position of Fig. 2, very little movement is given to bell crank lever 20 during the initial movement of the actuator, but, as soon as the cam roller 25 moves out of the first part 100 of slot 21, the bell crank lever 20 is given a sudden movement by the part 101 of slot 21 to throw the type bar to printing position. Upon the return of the type bar it will be observed that it is returned quickly during its initial movement and is then "eased" or "walked into" its final position owing to the fact that, while the stud 25 is returning through the part 100 of slot 21 no appreciable movement of bell crank 20 occurs. It is also to be noted that the portion 100 of the slot 21 is approximately concentric with the shaft 24 and that the arm of actuator 23 is approximately at right angles to the portion 100 of the slot. Any tendency of the bell crank 20 to move while the cam roller 25 is in the portion 100 of slot 21 is resisted by the actuator 23 in a direct line between roller 25 and the axis 24. In other words, rebound of the bell crank 20, induced by rebound of type bar 15, is effectively prevented, because any force tending to rock the bell crank 20 is transmitted to actuator 23 in a direction longitudinal of said actuator and does not tend to rock it about its axis 24.

Accordingly, when the type bar is returned, it is returned quickly and the actuator then moves into the portion 100 of the slot 21 such that the type bar is held against rebound movement. The type bar is quietly "walked" into final position and held against rebound without, however, destroying the effective action of the actuator in again moving the type bar to printing position.

Escapement mechanism

Each time a type bar is moved to printing position, the escapement mechanism is operated as follows:

Referring to Fig. 2, a link 110 is provided which is connected to the escapement mechanism that has not been shown in the present application as an understanding of its details is not necessary. This link is connected to one arm 111 of a bell crank lever pivoted on shaft 24 and provided with another arm 112 connected to a bail 113 extending across the machine under projections 114 on the actuators 23. Whenever one of the actuators is rocked clockwise from its Fig. 2 position the bail 113 is rocked clockwise and the link 110 moved forward to operate the escapement.

Case shift

The typewriter is changed from upper to lower case position and vice versa by power and this power is used to accomplish the shift in both directions. In the embodiment of the invention illustrated, the type basket is shifted instead of the platen.

Figure 4:
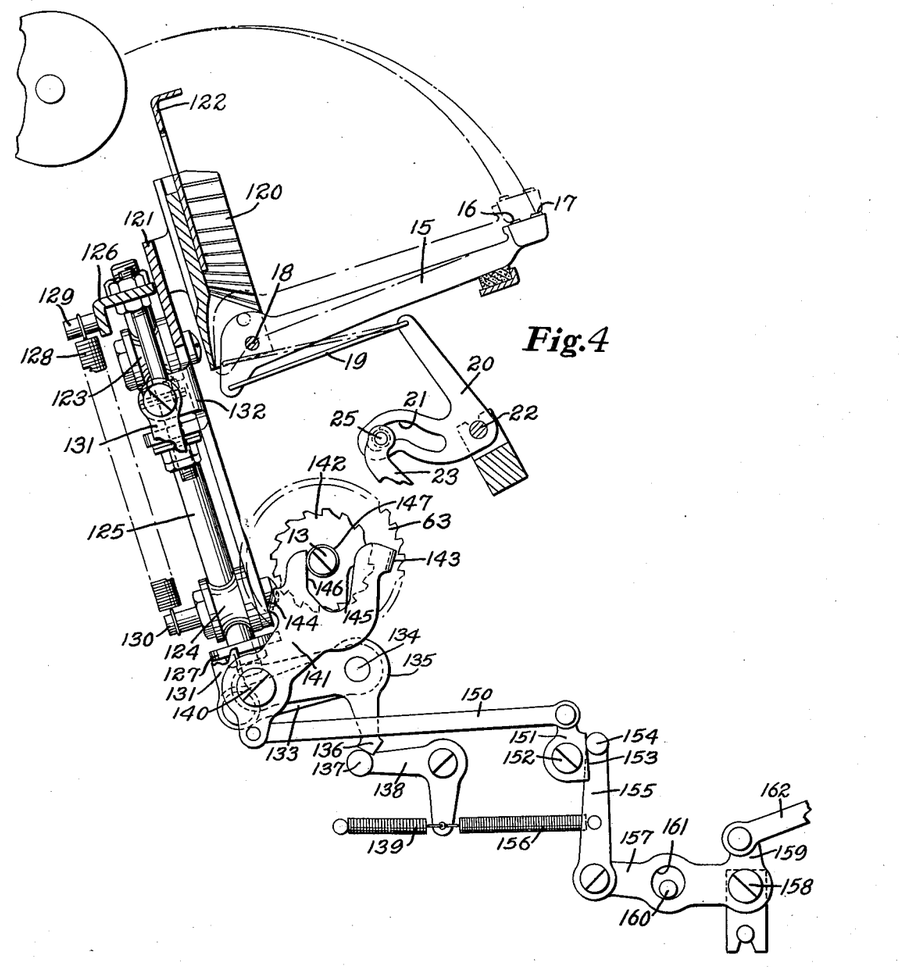
Fig. 4 is a partial left side elevation showing the type basket and the shifting mechanism therefor.

Referring to Fig. 4, the shaft 18 on which the type bars 15 are pivoted is carried by a type bar segment 120 attached to a movable supporting plate 121. The type bar segment carries a suitable type bar guide 122 for guiding the type bars during their final movement to printing position.

The supporting plate 121 carries an upper roller 123 and a lower roller 124 on each side which travel between substantially vertically arranged shafts 125 supported by the stationary plates 126 and 127 of the machine. The weight of the type bar basket and the type bars together with the supporting plate and associated parts is counterbalanced by a spring 128 attached at its upper end to a stud 129 on the stationary plate 126 and at its other end to the end of a shaft 130 on which the lower roller 124 is mounted. The arrangement is such that the spring counterbalances the weight of the type bar basket and associated parts so that the type bar basket is substantially balanced in all of its positions.

The type basket is moved from lower to upper case position and vice versa by means of a link 131 connected at its upper end to a lug 132 on the supporting plate 121 and at its lower end to an arm 133 fixed to a shaft 134. Fixed to this shaft is a bell crank lever 135, one arm of which has a spear-like head 136 cooperating with a stud 137 on a detent 138 urged clockwise by a spring 139, the arrangement being such that the detent tends to hold the type basket in either its upper or its lower position.

The other arm of bell crank 135 carries a stud 140 on which is pivoted a double-pointed pawl 141 adapted to engage a ratchet wheel 142 fixed to the power shaft 13. The pawl 141 has one lateral lug 143 on its forward side for engaging the ratchet wheel 142 and another lateral lug 144 at its rear for engaging said ratchet. The pawl has a slot in its upper end provided with a front abutment surface 145 and a rear abutment surface 146, both of said abutments being adapted to engage a collar 147 on shaft 13.

The case shift pawl 141 is positioned for engagement with the ratchet wheel 142 by means of a link 150 connected at its rear end to the lower end of the pawl 141 and, at its forward end, to a lever 151 pivoted on a stud 152 and provided with an abutment face 153. A stud 154 on an arm 155 is adapted to engage the abutment 153, the arm 155 being urged counterclockwise as viewed in Fig. 4 by a spring 156. The arm 155 is pivoted on one arm 157 of a bell crank lever pivoted at 158 and having a second arm 159. The movement of bell crank 157—159 is limited by a stud 160 positioned in an opening 161 in the bell crank lever. Connected to the arm 159 of the bell crank lever is a link 162 which extends forwardly (Fig. 3) where it is connected by a pin-and-slot connection to one arm 163 of another bell crank lever pivoted on a shaft 164 and urged counterclockwise, as viewed in Fig. 3, by a spring 165. The other arm 166 of this bell crank lever extends forwardly and is provided with a case shift key top 167.

When the typewriter is in its normal lower case position, the parts are in the position illustrated in Fig. 3 and in full lines in Fig. 5. The stud 154 engages the abutment surface 153 below the pivot 152 and the spring 156, acting on arm 155, urges the lever 151 clockwise. This tends to pull the link 150 forwardly but such action is limited by the engagement of abutment face 145 of pawl 141 with the collar 147 as shown in Fig. 5. At this time the lug 143 is out of the path of the teeth of ratchet wheel 142.

When the case shift key 167 is depressed, the bell crank 166—163 is rocked clockwise which pulls the link 162 forward. This rocks the bell crank 159—157 clockwise and moves the stud 154 upwardly from the full line position of Fig. 5 to the dot-and-dash position of said Fig. 5. When the stud 154 moves above the pivot 152, the action of spring 156 on arm 155 rocks the lever 151 counterclockwise which thrusts the link 150 rearward. This rocks the pawl 141 clockwise and causes the lug 144 to engage the rotating ratchet wheel 142. The ratchet wheel then picks up the pawl 141 and moves it downward which rocks the bell crank 135 counterclockwise and pulls the type basket link 131 downward to lower the basket to upper case position as shown in full lines in Fig. 4. As the parts move to upper case position, the spear head 136 moves from the position of Fig. 5 to that of Fig. 4 to hold the type basket in the position to which it is moved.

The pawl 141 is automatically disconnected, after the type basket has been moved, by engagement of the abutment face 146 on the pawl with the collar 147. As the pawl moves downward, the abutment 146 engages collar 147 and guides the pawl in a straight line downward so that it eventually is carried out of engagement with the ratchet wheel, the parts being proportioned so that this occurs at just the right moment.

As long as the case shift key is held depressed, the type basket remains in its upper case position but, upon release of the case shift key, the power operated mechanism comes into play to positively return the type basket to lower case position.

When the case shift key is released, the spring 165 (Fig. 3) returns the bell crank 163—166 counterclockwise to normal, the link 162 is thrust rearward, the bell crank 159—157 rocked counterclockwise and the arm 155 with its stud 154 pulled down to its Fig. 3 position. As the stud 154 moves downwardly on the abutment surface 153 below the pivot 152, the action of spring 156 rocks the lever 151 clockwise and pulls the link 150 forward. This rocks the pawl 141 counterclockwise and moves the lug 143 into engagement with the rotating ratchet wheel 142. The ratchet wheel picks up the pawl and pulls it upward which rocks the bell crank 135 clockwise. This rocks the shaft 134 clockwise and pushes the type basket link 131 upward to move the type basket to its upper position, which is its lower case position. As the type basket moves upwardly, the spear head 136 moves from the position of Fig. 4 to that of Fig. 5 to hold the type basket in the position to which it is moved.

The pawl 141 is automatically disconnected from the ratchet wheel 142 by the engagement of the abutment surface 145 on the pawl with the collar 147. As the pawl moves upward with the ratchet wheel, the abutment surface engages collar 147 and the pawl is guided in a straight line so that it is eventually cammed out of engagement with the ratchet wheel. The parts are proportioned so that this occurs at the right moment.

From the above, it will be observed that the power shaft 13 is utilized to change the machine both from lower to upper case position and from upper to lower case position and that neither springs nor gravity is depended upon for either movement.

A case shift lock is provided in the form of a case shift lock key 170 (Fig. 3) carried by one arm 171 of a bell crank lever pivoted on shaft 164. The other arm 172 of this bell crank lever extends upwardly and is positioned to the rear of a stud 173 on the link 162. The bell crank arm 171 is provided with a square stud 174 adapted to engage under a shoulder 175 on a latch 176 urged counterclockwise by a spring 177.

When the case shift lock key 170 is depressed, it rocks the bell crank 171—172 clockwise and pulls the link 162 forward to condition the machine so that the power shaft will move the type basket to upper case position. After the stud 174 moves past the shoulder 175 on latch 176, the latch is snapped over the stud to hold the bell crank 171—172 in its moved position. As long as it is held in this position, the type basket remains in upper case position.

The case shift lock may be released by depressing the regular case shift key 167. The latch 176 has a tail 178 positioned in the path of the arm 166 on which case shift key 167 is mounted. When key 167 is depressed, arm 166 engages the tail 178 of latch 176 and moves the latch to released position.

The pin and slot connection between the link 162 and lever 163 permits the link 162 to be moved a short distance when the case shift lock key 170 is depressed without carrying the case shift key 167 down with it, otherwise the downward movement of the case shift key 167 would cause the arm 166 to engage the lug 178 and prevent the latch 176 from locking the case shift lock key 170 in depressed condition, but with this construction, it will be evident that the case shift lock key will remain in locked down position until the case shift key 167 is depressed manually to release the latch 176 at which time the case shift lock key will be restored upwardly by a spring 179 until limited by a comb plate 179ª.

*Back space mechanism*

Figure 6:
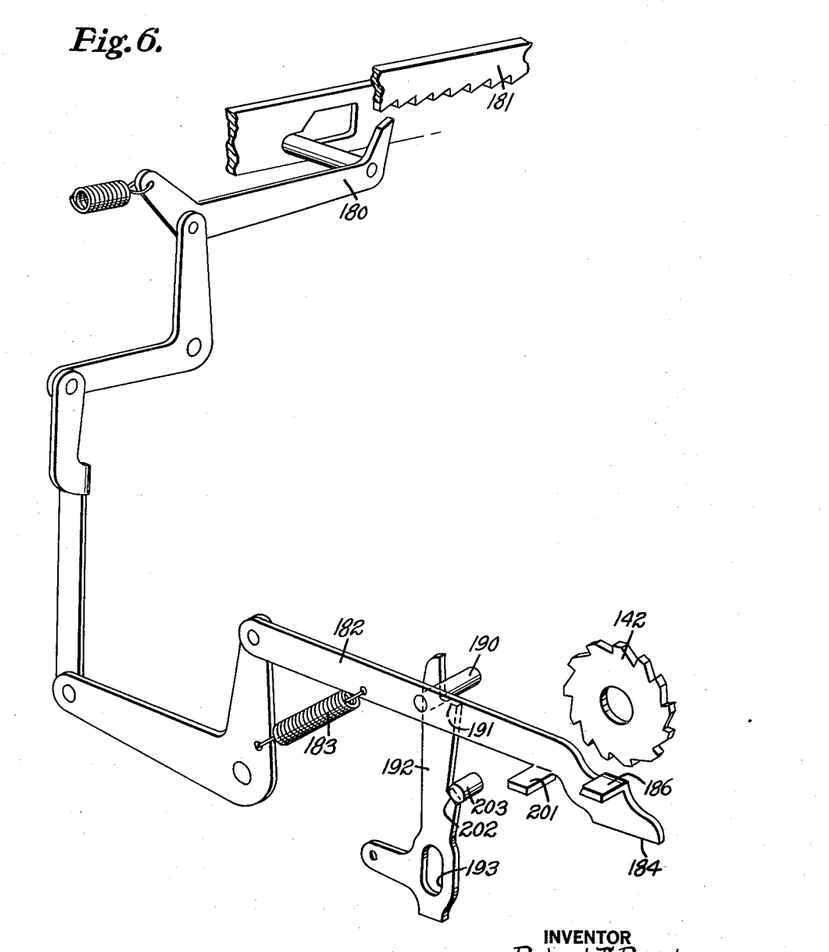
Fig. 6 is a detail view showing portions of the back spacing mechanism.
Figure 7:
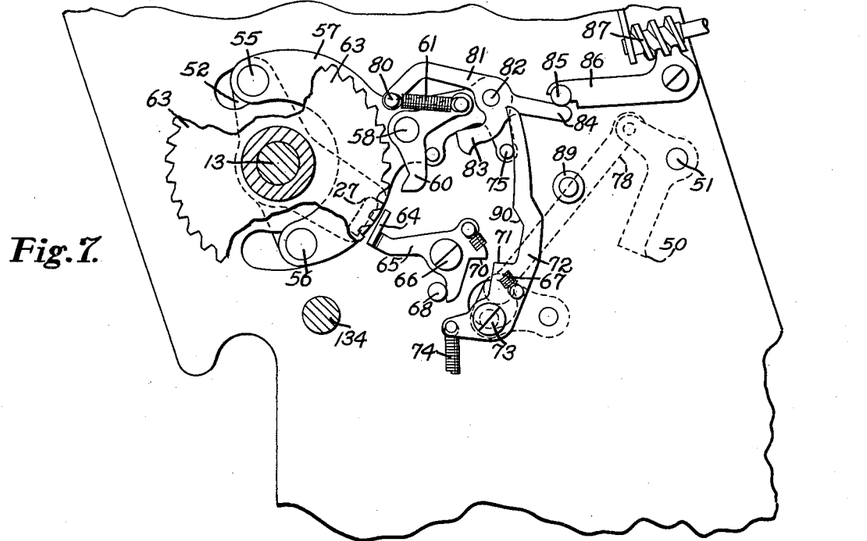
Fig. 7 is a fragmentary view of portions of Fig. 5 showing them in the position they occupy at the moment the power operation of the type bar is released.
Figure 8:
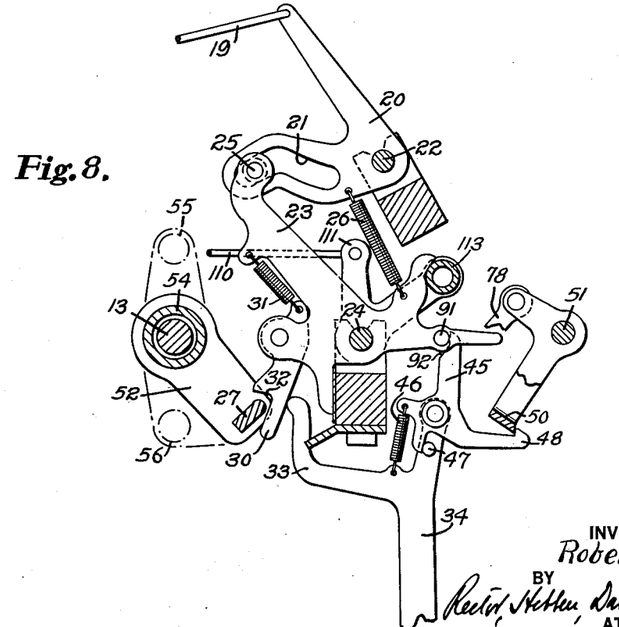

The back space mechanism includes a pawl 180 (Fig. 6) adapted to engage a rack 181 on the paper carriage in such a way that, when the pawl is actuated, the carriage is moved backward one step. This pawl is operated by means of a link 182 (Fig. 5) which is adapted to be engaged with the ratchet wheel 142 driven by power shaft 13.

The link is urged clockwise as viewed in Fig. 5 by a spring 183, the movement being limited by an abutment 184 on the link which engages a collar 185 on shaft 134.

The link has a lateral driving lug 186 provided with a sharp edge adapted to engage the ratchet wheel 142.

For the purpose of moving the link into driving engagement with the ratchet wheel, the link is provided with a stud 190 normally positioned above a shoulder 191 on one arm of a lever 192 pivoted by a pin-and-slot connection 193 to one end of an arm 194 and urged clockwise by a spring 195. The arm 194 is one arm of a bell crank lever pivoted at 196 and urged counterclockwise by spring 196ª. The other arm 197 of this bell crank is connected by a link 198 to a second bell crank lever 199 (Fig. 3) pivoted on the shaft 39. The bell crank 199 carries the back space key 200.

When the back space key 200 is depressed, bell crank lever 199 is rocked clockwise, link 198 is pulled forward, bell crank 197—194 is rocked clockwise, and the releasing lever 192 is moved upward. This moves the link 182 upward and causes the lug 186 to engage ratchet wheel 142. The ratchet wheel picks up the link and moves it forwardly to operate the back space mechanism one step.

The link 182 is automatically disconnected from the ratchet wheel 142 after the carriage has been back spaced a single step, by a lug 201 projecting from the lower edge of the link 182. When the rachet wheel 142 engages the lug 186, it moves the link 182 forward and counterclockwise thereby moving the projection 201 upward until it strikes the periphery of the ratchet wheel 142 to prevent further counterclockwise movement of the link 182. The link 182 continues slightly forward until the engaged ratchet tooth frees itself from the lug 186, at which time the spring 183 pulls the link 182 back to its Fig. 5 position with the abutment 184 again resting on the collar 185.

The carriage can be back spaced only one step for each depression of the back space key 200 and means are also provided to insure of a quick upward movement of the lug 186 of the link 182 into the path of the ratchet wheel 142, thereby preventing chattering that might result from the top of the lug 186 engaging the rotating ratchet when the back space key is slowly depressed. When the back space key is depressed, the pin and slot connection 193 permits the arm 194, that carries the stud 193, to move clockwise independently of the lever 192. The spring 195 urges the lever 192 clockwise against the stud 203 and said stud restrains upward movement of the lever 192 by engaging the bevelled shoulder 202. When the stud 193 on the end of the arm 194 reaches the upper end of the slot in the lever 192, it starts to lift the lever 192 and because of the bevelled shoulder 202 the lever 192 is cammed free of the stud 203 thereby enabling the spring 195 to snap the lever 192 upward for the shoulder 191 to engage the stud 190 and move the lug 186 into the path of the teeth of the ratchet wheel quickly without any chattering. The lever 192 is guided in its upward movement by its front face engaging the stud 203. Forward movement of the link 182 carries the lug 190 off the shoulder 191.

When the link 182 is released from the ratchet wheel 142, it moves back to its lower Fig. 5 position under the influence of spring 183. The stud 190 is then below the shoulder 191. Accordingly, as long as the back space key is held depressed, the link 182 cannot be raised a second time for engagement with the ratchet wheel. In order to cause a second engagement, the back space key must be released and depressed again.

I claim:

1. A power-operated, front-strike typewriter having a plurality of pivoted type bars, an actuator for each bar, a movable operating bail for moving said actuators to swing the type bars to printing position, said actuators being normally out of the path of said bail, power operating means, normally disconnected connecting means between said power operated means and said operating bail, a plurality of type keys, means associated with each key operable, upon the depression of a given key, for moving a portion of the actuator corresponding to said key into the path of said bail, power controlling means conditioned by depression of each of said keys for conditioning said connecting means to cause said operating bail to be connected to said power operating means, said connecting means having portions acting to automatically disconnect said bail from said power means after said bail has been moved a predetermined distance, and means operated by the moved actuator to automatically disconnect the depressed key from said power controlling means as the type bar is moved to printing position to prevent more than one operation of the type bar when the type key is held depressed longer than necessary.

2. A power-operated, front-strike typewriter having a plurality of pivoted type bars, an actuator for each type bar for swinging the latter to printing position, a movable bail for said actuators, said actuators being normally out of the path of said bail, power operating means, normally disconnected connecting means between said power operating means and said operating bail, a plurality of type keys, a lever operable by each type key for moving a portion of its actuator into the path of said bail, a power controlling bail connected to said connecting means and operable to condition the latter to connect said operating bail to said power operated means, a pivoted pawl on each of said levers normally connected to said power controlling bail for operating it upon depression of a key, and means operated by a moved actuator for disconnecting the pawl on the lever corresponding to said actuator from said power controlling bail when said actuator is moved.

3. In a power operated typewriter, a continuously rotating ratchet wheel, a member on said machine movable in one direction to a given position and returnable in the opposite direction therefrom, a pawl connected to said movable member, said pawl having one tooth adapted to engage one side of said ratchet wheel and another tooth adapted to engage the other side of said ratchet wheel, means for swinging said pawl to cause either of its teeth to engage said ratchet wheel, and means acting to automatically disengage said pawl from said ratchet wheel after it has been moved a predetermined distance by the engagement of either of its teeth with said ratchet wheel.

4. In a power operated typewriter, a continuously rotating ratchet wheel, a member on said machine movable in one direction to a given position and returnable in the opposite direction therefrom, a pawl connected to said member, said pawl having one tooth adapted to engage one side of said ratchet wheel and another tooth adapted to engage the other side thereof, spring means for swinging said pawl, and key controlled means operable to condition said spring means to cause it to swing said pawl in a chosen direction to thereby selectively engage the teeth of said pawl with said ratchet wheel to move said machine member in a chosen direction by power, and means acting automatically to disconnect said pawl from said ratchet wheel after said member has been moved a predetermined distance by engagement of the selected pawl tooth with the ratchet wheel.

5. In a power operated typewriter, a continuously rotating ratchet wheel, a member movable in one direction to a given position and returnable in the opposite direction therefrom, a pawl connected to said member, said pawl having one tooth adapted to engage said ratchet wheel on one side and another tooth adapted to engage said ratchet wheel on the other side, means for swinging said pawl to engage either of said teeth with said ratchet wheel, a slot in said pawl forming two abutment surfaces, and a collar in said slot adapted to engage said surfaces to disengage said pawl from said ratchet wheel after said pawl has been moved a predetermined distance by engagement of either of its teeth with said ratchet wheel.

6. In a power operated typewriter, a continuously rotating ratchet wheel, a member movable in one direction to a given position and returnable in the opposite direction therefrom, a pawl connected to said member, said pawl having one tooth adapted to engage one side of said ratchet wheel and another tooth adapted to engage the other side of said wheel, a pivoted lever connected to said pawl, said pivoted lever having an abutment surface, a spring urged arm engaging said abutment surface, means for moving said arm to cause it to engage said abutment surface above or below the pivot of said lever to selectively move said lever in either direction to optionally move either of the teeth of said pawl into engagement with said ratchet wheel, and means acting to automatically disengage said pawl from said ratchet wheel after said pawl has been moved a predetermined distance by engagement of either of its teeth with said ratchet wheel.

7. A typewriter having a traveling paper carriage, an escapement mechanism therefor, a power driving means including a toothed ratchet wheel, a back spacing mechanism, means for connecting said back spacing mechanism to said power drive including a pawl for effecting said connection and a spring operable, when tensioned, to move said pawl, means normally holding said spring against such operation, and means including a back spacing key operable, upon depression of said key, to first tension said spring and to then automatically release said holding means to permit said spring to quickly move said pawl into engagement with said ratchet wheel to thereby connect said back spacing mechanism to said power drive without chattering.

ROBERT T. BROCKMAN.